United States Patent [19]
Garrett et al.

[11] Patent Number: 5,576,612
[45] Date of Patent: Nov. 19, 1996

[54] ULTRAFAST RECHARGEABLE BATTERY PACK AND METHOD OF CHARGING SAME

[75] Inventors: Scott M. Garrett; Jose M. Fernandez, both of Lawrenceville, Ga.; Joseph Patino, Pembroke Pines, Fla.

[73] Assignee: Motorola, Inc., Schaumburg, Ill.

[21] Appl. No.: 376,613

[22] Filed: Jan. 23, 1995

[51] Int. Cl.$^6$ .............................. H01M 10/44; H02J 7/04
[52] U.S. Cl. .................. 320/54; 370/35; 370/12; 361/38
[58] Field of Search .................. 320/12, 13, 29, 320/49, 54, 36, 35; 361/58, 104, 106; 363/47; 323/901, 284, 282, 289

[56] References Cited

U.S. PATENT DOCUMENTS

| | | | |
|---|---|---|---|
| 3,497,794 | 2/1970 | Fredrickson et al. | 323/282 |
| 3,525,033 | 8/1970 | Greenberg et al. | 323/282 |
| 3,831,081 | 8/1974 | Weiss | 323/22 |
| 3,961,208 | 6/1976 | Khanna | 323/282 |
| 4,027,228 | 5/1977 | Collins | 323/282 |
| 5,146,150 | 9/1992 | Gyenes et al. | 320/17 |
| 5,420,451 | 5/1995 | Williams et al. | 257/402 |
| 5,471,128 | 11/1995 | Patino et al. | 320/13 |

FOREIGN PATENT DOCUMENTS 3-0251044  11/1991  Japan ..................... 361/106

OTHER PUBLICATIONS

Raychem, "Protection of Batteries With PolySwitch Devices".

Primary Examiner—Matthew V. Nguyen
Assistant Examiner—Gregory J. Toraley, Jr.
Attorney, Agent, or Firm—Scott M. Garrett

[57] ABSTRACT

A battery pack (10) includes at least one battery cell (16) and a current interrupt device (18) adapted to protect said cells from damage during charging or discharge. The battery pack (10) is further adapted to be recharged at extremely fast recharge rates via the use of a bypass switch (20) which allows current to be diverted around current interrupt device (18) during recharge. The bypass switch (20) is controlled by a control circuit (22) which provides a control signal and response to sensing a charge current.

6 Claims, 4 Drawing Sheets

ULTRAFAST RECHARGEABLE BATTERY PACK AND METHOD OF CHARGING SAME

TECHNICAL FIELD

This invention relates in general to rechargeable battery packs, and more particularly to battery packs which can be recharged in an ultrafast manner.

BACKGROUND

As electronic devices are integrated into smaller portable packages, there is an increasing need for a battery power source that can allow a practical operation period of the device. In most cases, economics require such batteries to be rechargeable. Unfortunately, the technology concerned with energy density of such power sources has not kept pace with electronics integration technology. This has resulted in the now common situation where the battery constitutes a major portion of the volume and weight of a given system, examples of which are cellular phones and portable computers.

A solution, in part, lies not in a breakthrough battery chemistry, but in the understanding of the paradigm which dictates that batteries must last as long as possible. The reason is the long recharge period of the battery. Currently most battery rechargers take from one to three hours to completely recharge a battery. This is referred to as a fast or rapid charge. However, this is too long to wait considering the device it powers may only operate one to three hours on a full charge. If the battery could be recharged in a much shorter period of time, 10–15 minutes for example, then, at least in some cases, consumers would not need large batteries or multiple batteries since the battery could be fully recharged during a coffee break, or while traveling to a business appointment.

The technology necessary to recharge batteries faster has existed, though this fast recharge is often at the expense of cycle life. That is, the number of charge/recharge cycles the battery can provide is often degraded by very fast charging. This trade off is acceptable in commercial applications where the cost is passed on to the consumer. However, a consumer who owns a cellular phone wants to avoid buying new batteries as they are somewhat costly. Therefore, a battery power system with long cycle life has a consumer market advantage, and a system that offers a very short recharge time in addition would be very desirable.

The ability to recharge in a short period of time, without substantially degrading cycle life has in fact been achieved, and is referred to as "ultrafast" charging. Several charge regimes have been developed for nickel cadmium and nickel metal hydride battery systems that provide ultrafast charging. All of the ultrafast charge regimes involve the use of a high average current. In fact, for a 15 minute recharge, the average current applied to the battery must be equal to, if not greater than, four times the current level required for a one hour recharge. This is simple in principle, but much more difficult to implement. The problem is that battery packs for consumer use, and many for commercial use, employ a current interrupt device (CID), such as a resettable fuse, such as that sold under the trade name PolySwitch by the Raychem corporation. The CID is responsive to the current level of the battery and disconnects the cells from further conduction once some threshold current has been reached. This prevents accidental shorting of the battery pack which could otherwise pose a risk to the battery. Hence removal of the CID is not a desirable option.

Typically the safety threshold current level is near, or lower than the ultrafast recharge current level. When these battery packs are recharged at such a high current level, the CID activates and disconnects the battery pack from further charging. It is possible to have a battery pack with separate charging and device contacts, thereby allowing placement of the CID between the battery cells and the device contacts. This approach requires protection of the charger contacts with a diode to prevent an accidental discharge through that path. Two problems exist with this approach. First, in small multiple cell batteries, where the components are packaged very tightly to minimize the size of the battery pack, there is the risk of internal shorting, that is, from one cell to another, or even across the entire cell pack. The occurrence of such an event is minimized by the design of the battery pack, but, once sold, it may experience any number of abusive conditions including being crushed, punctured, or excessively vibrated. By placing the CID in between the cells, the safety of the battery pack is improved since only a limited number of cells could short together. For example, in a six cell battery, the maximum number of cells that could be shorted can be reduced from 6 to 3 by placing the CID in the middle of the cell pack.

The second problem results from the use of a diode in the recharge current path. Given the high current used in ultrafast charging, the diode will heat and dissipate that heat inside the battery pack. In some cases this can cause the charger to stop charging prematurely. In addition, some regimes require a brief discharge pulse at regular intervals during the charge process. This is commonly known as "burp" charging since it helps to eliminate the formation of gases inside the battery cells.

Therefore there exists a need for a battery pack with an optimally placed CID that can be recharged in an ultrafast manner. When there are separate charger and device contacts, there is also a need to provide discharge protection for the charger contacts when the battery pack is not in a charger, but may allow discharge when being charged. Additionally, it would be marketably advantageous if such a battery pack was retrofittable into existing battery chargers.

DETAILED DESCRIPTION OF THE PREFERRED EMBODIMENT

Figure 1:
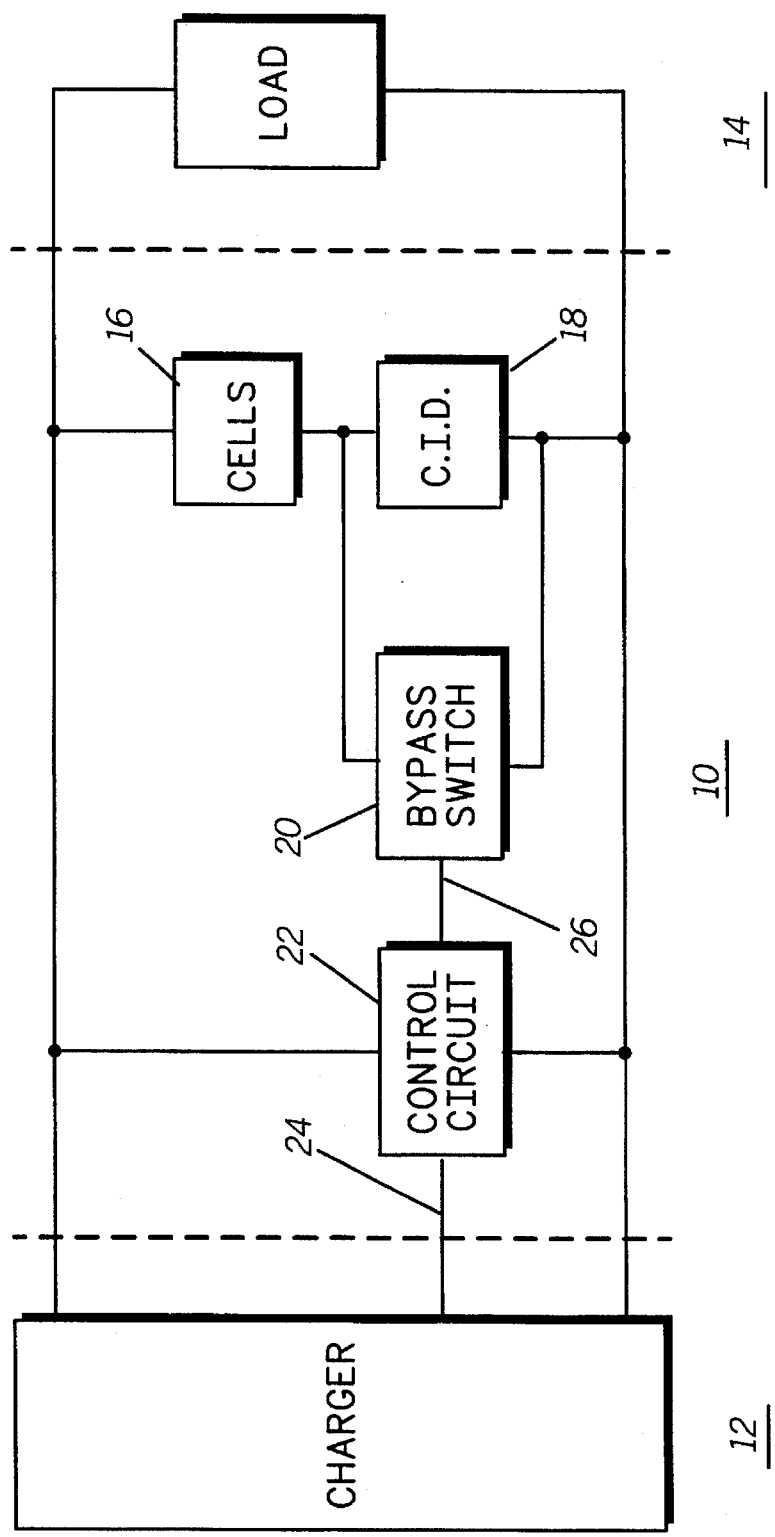
FIG. 1 is a block diagram of a battery pack with a CID and a bypass switch in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a battery system including a battery pack 10, a charger 12 and a load 14. Battery pack 10 is comprised of at least one battery cell 16, current interrupt device (CID) 18, bypass switch 20, and control circuit 22. Battery cells 16 store energy in an electrochemical system and provide electrical energy in the form of voltage and current. Battery cells 16 are rechargeable by the application of a recharge current, and may be any rechargeable battery system such as lead-acid, zinc-air, Ni-Cd, Ni-metal hydride, lithium ion, or lithium polymer batteries.

CID 18 normally has a low resistance, and is connected in series with battery cell 16 so that all current through battery cells 16, whether discharge or recharge current, passes through CID 18 as well. CID 18 has a preselected threshold current level such that when current through it reaches the threshold level, CID 18 interrupts the current path to block any further current flow. CID 18 may or may not be resettable, that is, allow current flow after activating once. Examples of CIDs include resettable fuses, such as those sold under the trade name PolySwitch by the Raychem corporation. When battery pack 10 is connected to charger 12, charger 12 provides a signal on line 24 which is fed to control circuit 22. In response, control circuit 22 provides an actuating signal on line 26 which is fed to bypass switch 20, which becomes actuated, thereby providing a bypass for current around CID 18. Charger 12 may then apply an ultrafast recharge current until battery cells 16 are fully recharged.

Figure 2:
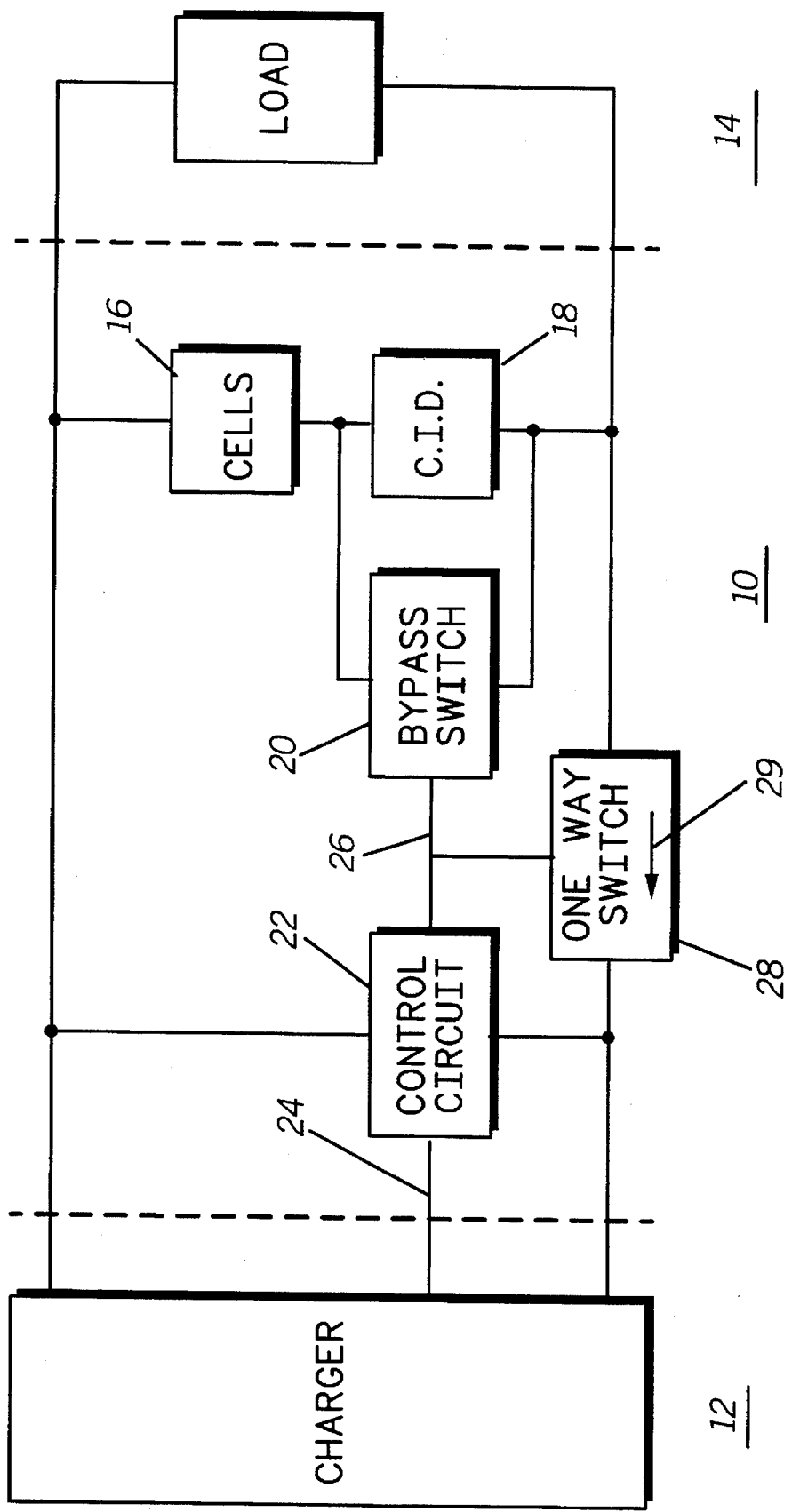
FIG. 2 is block diagram of a battery pack as in FIG. 1 and a discharge protection means, in accordance with the invention.

Although battery pack 10 is shown here connected to charger 12 and load 14 at the same time, this particular configuration is more suited to the case where there is only one connection point. That is, battery pack 10 may be connected to either charger 12 or load 14, but not both at the same time. Referring now to FIG. 2, where there is illustrated therein battery pack 10, as in FIG. 1, but further comprising a one-way switch 28. By one way it is meant that current in the direction of arrow 29, recharge current, can flow at any time. However, current in the other direction, i.e., discharge current, may be blocked, depending on the switch state of switch 28. The reason for the inclusion of switch 28 is for the case where battery pack 10 has separate connection points for charger 12 and load 14. When battery pack 10 is connected to load 14 only, the connection point, which is typically a contact set, for charger 12 is exposed, and subject to being accidentally shorted. If switch 28 where not present, current could be drawn from the charger contact set for a brief period until CID 18 activated. Even this brief current pulse could pose a safety hazard in extreme circumstances. Switch 28 blocks such current when not actuated by control circuit 22 to eliminate this hazard.

Figure 3:
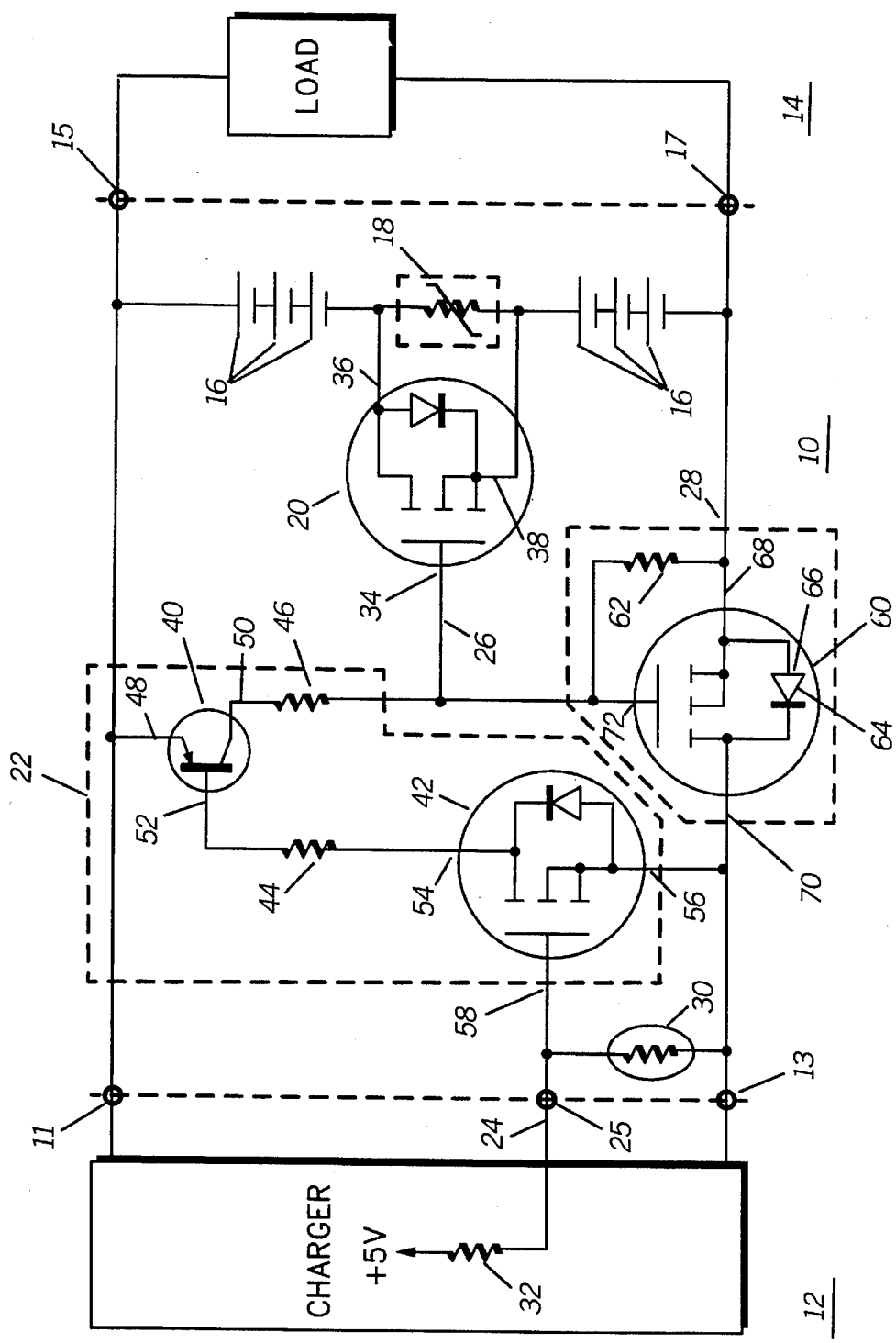
FIG. 3 is a schematic circuit diagram of a battery pack in accordance with the invention.

Referring now to FIG. 3, where there is illustrated therein a circuit diagram of a charging circuit in accordance with the instant invention. There is shown battery pack 10 which may be connected to charger 12 by means of positive charger contact 11 and negative charger contact 13. Battery pack 10 may also be connected to load 14 by means of positive device contact 15 and negative device contact 17. Battery pack 10 is comprised of rechargeable battery cells 16, CID 18, bypass switch 20, control circuit 22, and switch 28. The battery pack 10 further comprises an element for providing charger 12 with information about battery pack 10, shown here as thermistor 30. Thermistor 30 is a common element included in battery packs for portable electronic devices and is used to sense the temperature of battery cells 16 while being charged. Charger 12 applies a voltage to thermistor 30 through resistor 32 on line 24 contacts which battery pack 10 of contact 25, and monitors changes in resistance of thermistor 30 based on changes in the voltage signal. This voltage signal is fed to control circuit 22 as previously described.

In one embodiment CID 18 is a Resettable fuse, and when more than one cell is used, CID is placed in between the cells (if possible), rather than before or after the cells. Resettable fuses are also common elements in battery packs for portable electronics. Bypass switch 20 may be a MOSFET transistor, such as Motorola part MTD3055E, but could be any other switch element such as a relay or silicon controlled rectifier (SCR). MOSFET 20 has gate terminal 34, source terminal 36, and drain terminal 38, and is connected such that drain terminal 38 and source terminal 36 are disposed across CID 18. It is preferred that MOSFET 20 be a N-channel enhancement mode type, and if fewer than 4 battery cells are employed, then MOSFET 20 should be a logic level type, such as a Motorola part MTD3055EL. Bypass switch 20 may also be a bipolar type transistor. If a bipolar transistor is employed, CID 18 should not ordinarily be connected in between the battery cells to avoid a cell imbalance condition. This would result if the bipolar transistor were placed in between the cells since one leg of a bipolar transistor conducts slightly more current than another, and therefore one set of cells would always receive more current during recharge.

To actuate bypass switch 20, and allow recharge current to flow around CID 18, control circuit 22 provides an actuation signal on line 26, which is connected to gate terminal 34, when battery pack 10 receives a voltage signal on line 24. Control circuit 22 is comprised of a first switch transistor 40, second switch transistor 42, and current limiting resistor 44. Control circuit 22 may also include output resistor 46. First switch transistor 40 may be a PNP type bipolar transistor having emitter terminal 48, collector terminal 50, and base terminal 52. Emitter terminal 48 is connected to positive charger contact 11, and collector terminal 50 is connected to line 26 either directly, or through output resistor 46. Second switch transistor 42 may be a MOSFET, and has drain terminal 54, source terminal 56, and gate terminal 58. Drain terminal 54 is connected to base terminal 52 of first switch transistor 40 through current limiting resistor 44. Gate terminal 58 is fed the voltage signal provided by the charger on line 24. Source terminal 56 is connected to negative charger contact 13.

When battery pack 10 is connected to charger 12, a voltage signal is applied to line 24. This causes second switch transistor 42 to switch on and the effective resistance between drain terminal 54 and source terminal 56 drops to a relatively low level. In this state, current flows from the base terminal 52 of first switch transistor 40 to second switch transistor 42, and causes first switch transistor 40 to conduct current from emitter terminal 48 to collector terminal 50, and thereby provides the actuation signal. In this state, the gate terminal 34 of bypass transistor 20 is biased to a high voltage and causes the effective resistance between source terminal 36 and drain terminal 38 to drop to a relatively low level, and thereby provides a bypass path around CID 18.

In an alternative embodiment, where the device contact set and charger contact set are separate, switch 28 may also be included. Switch 28 comprises MOSFET 60 and resistor 62. MOSFET 60 has source terminal 68, drain terminal 70, and gate terminal 72, and includes an intrinsic diode 64 that has an anode 66. Diode 64 is disposed between source terminal 68 and drain terminal 70 with anode 66 connected to source terminal 68. Gate terminal 72 is connected to line 26 and thereby receives the actuation signal at the same time as bypass switch 20. When the actuation signal is applied, MOSFET 60 switches to a relatively low effective resistance and allows current conduction in both directions. When the actuation signal is absent, MOSFET 60 provides a diode action due to intrinsic diode 64. The advantage of orienting MOSFET 60 as shown and described is, should battery pack 10 be connected to a standard charger, i.e. one that does not provide an ultrafast recharge current or a voltage signal, (or both), whatever recharge current is applied will flow through diode 64 and allow charging of battery cells 16. Resistor 62 provides a pull down action for line 26 so that the gate terminals 34 and 72 of MOSFETs 20 and 60 respectively are at a low voltage state when the actuation signal is absent. Resistor 62 should be included with bypass switch 20 if switch 28 is not employed.

As an alternative choice, switch 28 could be implemented with a bipolar transistor and a diode. The diode would be oriented as diode 64, and the bipolar transistor's base, collector, and emitter terminals would be connected where MOSFET 60 has gate, drain, and source terminals 72, 70, and 68 respectively.

Figure 4:
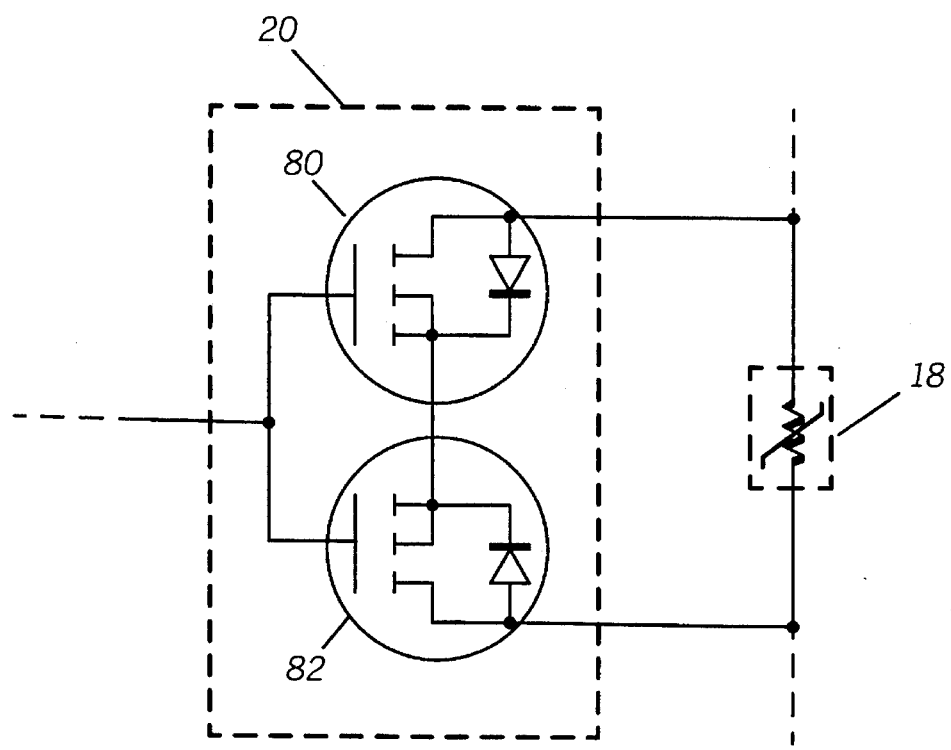
FIG. 4 is a schematic circuit diagram of a first alternate embodiment of the bypass switch of FIG. 4.
Figure 5:
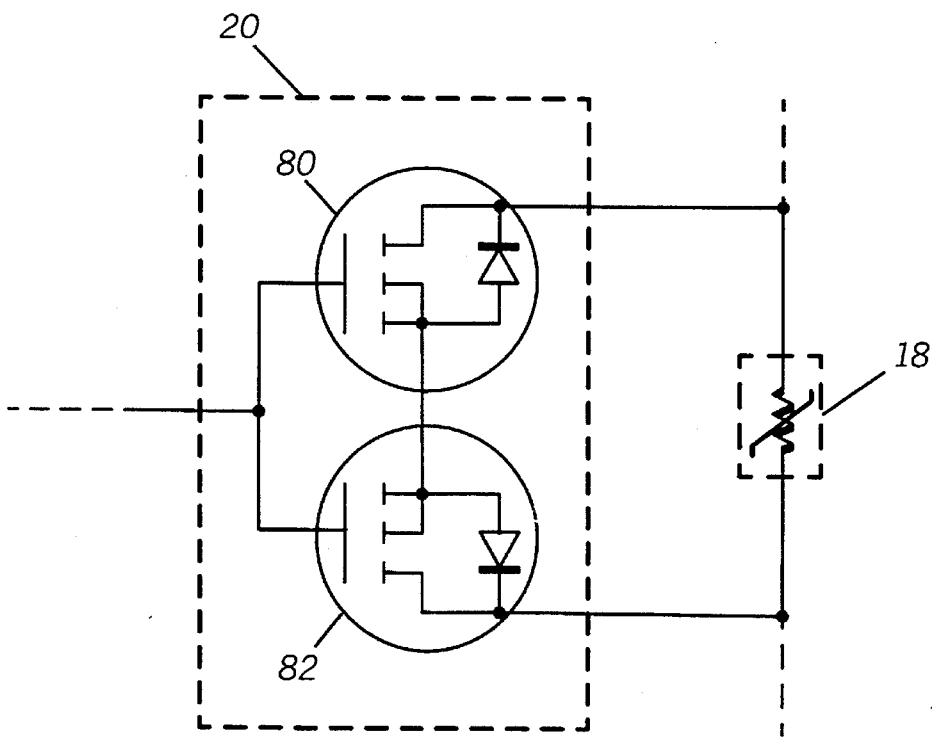
FIG. 5 is a schematic circuit diagram of a second alternate embodiment of the bypass switch of FIG. 4.

FIG. 4 and FIG. 5 show schematic circuit representations of alternative bypass switch 20 implementations. Both show slightly dissimilar versions of implementations of the same function. In each of FIGS. 4 & 5, two MOSFETs are shown connected in a back to back configuration to eliminate the effect of the intrinsic diode in MOSFETs which is a result of their manufacture. FIG. 4 shows a first MOSFET 80 connected in series with a second MOSFET 82, both of which are disposed across, and in parallel with, CID 18. In this first alternative embodiment, the MOSFETs are connected drain terminal to drain terminal. In FIG. 5, first MOSFET 80 and second MOSFET 82 are also connected in series, as in FIG. 4, but are connected source terminal to source terminal. In each case the intrinsic diode of one is oriented in the opposite sense from the second. In this configuration, when CID 18 has been activated, bypass switch 20 will block both recharge and discharge current if it has not been actuated.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack having at least one rechargeable battery cell, said battery pack comprising:
    a current interrupt device coupled in series with said at least one battery cell;
    a transistor device connected parallel to said interrupt device and responsive to an actuating signal;
    a control circuit comprising a first switch transistor for providing said actuating signal and a second switch transistor for driving said first switch transistor in response to a voltage signal;
    first and second contact sets; and
    a transistor switch connected between said at least one rechargeable cell and at least one of said contact sets, said transistor switch being switchable between a high and low resistance states in response to said actuating signal.

2. A battery pack as defined in claim 1, wherein said battery pack comprising at least two rechargeable battery cells coupled in series, and said current interrupt device is coupled between said rechargeable battery cells.

3. A battery pack as defined in claim 1, further comprising an element for providing a battery charging device with information about said battery pack when said battery charging device applies a voltage to said element.

4. A battery pack as in claim 3, wherein said elements for providing said charger with information about said battery pack is a thermistor.

5. A battery pack as defined in claim 1, wherein said transistor switch comprises a MOSFET having a gate terminal, a source terminal, and a drain terminal, and a bias resistor connected between said gate terminal and said source terminal.

6. A battery pack as defined in claim 1, wherein said current interrupt device is a resettable fuse.

* * * * *